Patented Feb. 27, 1934

1,949,266

UNITED STATES PATENT OFFICE 1,949,266

ADSORBENT

John C. Bird, Philadelphia, Pa., assignor to John Wyeth & Brother, Incorporated, Philadelphia, Pa., a corporation of Delaware No Drawing. Application October 6, 1932
Serial No. 636,579

4 Claims. (Cl. 167—55)

This invention relates to intestinal adsorbents, and has for its primary object the preparation of an adsorbent which shall be protective against gastro intestinal irritants, adsorbent of the soluble products of putrefaction or infection and of excessive acidity, and which shall form a mildly astringent corrective for the atonic bowel.

In accordance with this invention the intestinal adsorbent consists of colloidal kaolin of finest medicinal quality rendered more actively adsorbent by dispersion in neutral aluminum hydroxide gel.

The native silicate of aluminum known as kaolin is an insoluble impalpable powder, chemically inert and unacted upon by either acids or alkalis.

Kaolin possesses an enormous superficial area and is one of the most powerful adsorbents known. It adsorbs substances such as bacterial toxins, alkaloidal poisons and similar undesirable debris of the intestinal tract. Experiments have shown that kaolin is not an antiseptic agent, but if kept in motion in fluid media it will adsorb large numbers of bacteria, being known to combine with the toxins and toxic products of cholera, and with the typhoid dysentery organisms. It is also an attractor of putrefactive and proteolytic bacteria.

In order to give the best preparation for the internal administration of kaolin I have found that an emulsion of medicinal kaolin with aluminum hydroxide gel so activates the kaolin as to produce the desired results.

This aluminum hydroxide gel is preferably prepared in the following manner:

16 lbs. of granular aluminum chloride C. P. is dissolved in 30 gallons of distilled water and filtered clear into a vessel of approximately 100 gallons capacity. 32 lbs. of ammonia 16° (10%) is diluted with 15 gallons of distilled water. With the solutions of aluminum chloride and ammonia at an approximate temperature of 35° centigrade the ammonia solution is poured into the aluminum chloride solution in a thin stream at a slow rate, constant stirring of the aluminum chloride being kept up during the pouring operation.

Aluminum hydroxide is thrown out as a gelatinous precipitate which breaks up under agitation. After the whole of the ammonia solution has been added to the aluminum chloride a slight excess of ammonia is added to the combined mixture, which is then allowed to settle. The supernatant liquid is then siphoned off and the resultant precipitate washed at least five times with distilled water, the precipitate being allowed to settle after each washing, the resultant supernatant wash liquid being siphoned off after each settling until the precipitated aluminum hydroxide is free of ammonium chloride.

The resultant aluminum hydroxide gel thus precipitated has the appearance of a smooth translucent cream, and possesses great superficial area of particle and high adsorptive power.

The gel is then transferred to a clean receptacle and is diluted with distilled water to approximately 15 gallons. Substantially 39 pounds of finest medicinal colloidal kaolin is stirred with sufficient water to form a thin cream, the cream thus prepared then being strained through a fine cloth. After straining the kaolin is mechanically mixed with the aluminum hydroxide gel and to the mixture is added sufficient distilled water to bring the mixture to 25 gallons.

In order to render the product more palatable suitable flavor is now added. I have found the following acceptable:

| | |
|---|---|
| Saccharin soluble | 125 grs. |
| Oil anise | 160 mins. |
| Oil peppermint | 160 mins. |
| Oil pineapple | 120 mins. |
| Compound spirits orange | 400 mins. |

After the addition of the flavor the mixture is emulsified by passing through a homogenizer or other suitable emulsifying apparatus. The resultant product is a white creamy fluid compound of approximately 20% medicinal kaolin emulsified by 2½% absolute aluminum hydroxide (dry basis), with the remainder consisting of distilled water and flavor.

By combining kaolin and aluminum hydroxide gel in the manner stated, the amount of kaolin per dose is appreciably lower than has been necessary to use in administration heretofore. This reduction of dosage of kaolin is accomplished by intensifying its adsorptive effect with aluminum hydroxide gel, and kaolin thus peptized and rendered stable and motile by aluminum hydroxide gel offers medication by physical adsorption without systemic absorption of either the kaolin or the aluminum hydroxide gel.

The action of this adsorbent is in the main physical, chemical reaction occurring in the intestinal tract as a result of the administration of this emulsion being infinitesimal, or entirely absent.

Variation in the exact amounts specified herein may be made without departing from the spirit of the invention.

What I claim is:

1. An intestinal adsorbent comprising kaolin and aluminum hydroxide gel.

2. An intestinal adsorbent comprising kaolin and an emulsifier comprising a non-toxic, astringent, inorganic hydroxide gel.

3. An intestinal adsorbent comprising a major portion of kaolin, and a minor portion of aluminum hydroxide gel.

4. An intestinal adsorbent comprising kaolin, aluminum hydroxide gel, and water, the kaolin held in dispersion in the water by the said gel.

JOHN C. BIRD.